United States Patent
Yasuhara et al.

[11] Patent Number: 6,028,290
[45] Date of Patent: Feb. 22, 2000

[54] ARC WELDING APPARATUS

[75] Inventors: Yoshimichi Yasuhara, Ibaraki; Masafumi Naruto, Osaka; Masayuki Okubo, Takatsuki, all of Japan

[73] Assignee: Matsushita Electric Industrial Co., Ltd., Osaka-fu, Japan

[21] Appl. No.: 09/129,430

[22] Filed: Aug. 5, 1998

[30] Foreign Application Priority Data

Aug. 7, 1997 [JP] Japan .................................. 9-212816

[51] Int. Cl.[7] ...................................................... B23K 9/10
[52] U.S. Cl. ............................................................ 219/130.1
[58] Field of Search ............................. 219/130.1, 130.5, 219/137 PS, 130.21

[56] References Cited

U.S. PATENT DOCUMENTS 3,921,055 11/1975 Dorsey .................................. 219/130.1
3,995,137 11/1976 Okada et al. ....................... 219/130.21

FOREIGN PATENT DOCUMENTS 2723767 11/1997 Germany ............................ 219/130.1

*Primary Examiner*—Clifford C. Shaw
*Attorney, Agent, or Firm*—Greenblum & Bernstein, P.L.C.

[57] ABSTRACT

An arc welding apparatus is constructed of: a welding transformer 1, wherein a first tap T1 is provided at a point of half N/2 of the total number of turns N of the secondary winding of the transformer 1, the first tap T1 is connected to the electrification section 9 of a manual welding holder 8, a second tap T2 is provided at a point of N1 turns from the start Ts of the secondary winding, the second tap T2 is connected to a second thyristor 3, a first thyristor 2 and a third thyristor 4 are connected across both ends of the secondary winding, a third tap T3 is provided at a point of half N1/2 of N1 turns of the secondary winding and the third tap T3 is connected to a $CO_2$ arc welding torch 10; a control circuit 6 for controlling these thyristors 2–4, a gate signal switchover circuit 5 for executing switchover between gate signals of the thyristors 2–4; and a reactor 7 for smoothing a welding current. The arc welding apparatus executes switchover between manual welding and $CO_2$ welding by means of thyristors, thereby manufacturing the apparatus at low cost and achieving improved reliability.

7 Claims, 2 Drawing Sheets

ARC WELDING APPARATUS

BACKGROUND OF THE INVENTION

The present invention relates to an arc welding apparatus that can selectively switch between output characteristics having two types of high and low no-load voltages by one arc welding apparatus, and in particular, to an arc welding apparatus having a construction for selectively switching between $CO_2$ welding, MIG (Metal Inert Gas arc) welding or TIG (Tungsten Inert Gas arc) welding that permit a low no-load voltage and manual welding that requires a high no-load voltage.

A prior art arc welding apparatus will be described with reference to FIG. 2.

In FIG. 2 are shown a welding transformer 1, a first thyristor 2 for controlling an output current, a second thyristor 3, a welding method changeover switch S1 for selecting either $CO_2$ welding or manual welding, a control circuit 6 for controlling the phases of the first and second thyristors, a reactor 7 for smoothing a welding current, a manual welding holder 8 for holding an electrode rod (electrification section) 9 for manual welding, a $CO_2$ welding torch 10 a base metal (workpiece) 11 for welding.

In performing $CO_2$ arc welding by this prior art, the anodes of the first thyristor 2 and the second thyristor 3 have been connected by the welding method changeover switch S1 to taps 1a and 1c provided on the secondary winding side of the welding transformer 1, the cathodes of the first thyristor 2 and the second thyristor 3 have been connected to the $CO_2$ welding torch 10 by the welding method changeover switch S1, and the neutral point of the welding transformer 1 have been connected to the workpiece 11 via the reactor 7 for smoothing the welding current.

In performing manual welding, the anodes of the first thyristor 2 and the second thyristor 3 have been connected to taps 1b and 1d provided on the high voltage side of the welding transformer 1 by the welding method changeover switch S1, and the cathodes of the first thyristor 2 and the second thyristor 3 have been connected to the electrification section 9 of the manual welding holder 8 by the welding method changeover switch S1.

In general, the required output characteristics differ depending on each welding method. The $CO_2$ arc welding requires an output characteristic of a low voltage and a large current supply capacity, while the manual welding requires a higher voltage than that of the $CO_2$ arc welding but requires not so large current supply capacity. According to the prior art arc welding apparatus, in order to obtain different output characteristics depending on each welding method by means of one welding apparatus, one pair of the taps 1a, 1b, 1c and 1d provided on the secondary winding of the welding transformer 1 is connected to the anode of the first thyristor 2 or the second thyristor 3 by means of the triple-pole double-throw welding method changeover switch S1.

Then, the large-size triple-pole double-throw welding method changeover switch S1 has been changed over to determine whether to connect the output of the welding apparatus to the $CO_2$ welding torch or to the electrification section of the manual welding holder, connecting the cathodes of the first and second thyristors 2 and 3 to either the electrification section of the manual welding holder 8 or to the $CO_2$ welding torch 10.

However, the prior art arc welding apparatus has been required to employ the large-size triple-pole double-throw welding method changeover switch for performing switching of a large current, and this large-size triple-pole double-throw welding method changeover switch has occupied a large part of the material cost of the arc welding apparatus. The contact points of the switch, which turn on and off a large current, tends to wear out soon, and this has led to a disadvantage in terms of contact point operating life.

Furthermore, this large-size triple-pole double-throw welding method changeover switch has been required to be operated until the contact points are mechanically completely turned on.

SUMMARY OF THE INVENTION

The object of the present invention is to solve the aforementioned problems of the prior art.

In order to achieve this object, a first means of the present invention employs at least three thyristors for executing non-contact switchover between output characteristics. In the case of $CO_2$ arc welding, the thyristor connected to the tap on the low voltage side of a secondary winding of a welding transformer is selected. In the case of manual welding, the thyristor connected to the high voltage side of the secondary winding of the welding transformer is selected.

The first means of the present invention employs no large-size triple-pole double-throw welding method changeover switch, and this reduces the material cost, simplifies the circuit and reduces the number of processes for assembling, results in reduction in manufacturing cost. By virtue of the switchover between the thyristor circuits through which large currents flow achieved in a no-contact manner by the gate signal switchover circuit, there is required no care about the exhaustion of the contact points. This produces an effect that the product life of the arc welding apparatus is prolonged to improve the reliability, an effect that the possible occurrence of the burning of the contact points due to incomplete turning-on of the switch is prevented to allow easy operation and an effect that a toggle switch or a pushbutton switch for small-size small-current use is permitted to be used for the gate signal switchover circuit, achieving a simplified operation.

A second means of the present invention executes switchover to determine whether to connect the output of the welding apparatus to the $CO_2$ welding torch or to the electrification section of the manual welding holder. For this purpose, a first tap is provided at a point of half (N/2 turns) of the total number of turns (N turns) of the secondary winding of the welding transformer, and this first tap is connected to the electrification section of a manual welding holder. A third tap is provided at a point of half (N1/2 turns) of N1 turns from the starting end of the secondary winding, and the $CO_2$ arc welding torch is connected to the third tap, and the third tap is connected to the $CO_2$ welding torch. The electrification section of the manual welding holder or the $CO_2$ welding torch is connected to the neutral point of the secondary winding of the welding transformer connected to one pair of thyristors selected depending on each welding method.

The second means of the present invention produces an effect that the switch for turning on and off the output side of the welding apparatus can be removed and an effect that no large-size special switch is required to be used, allowing the material cost of the arc welding apparatus to be inexpensive.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The first means of the present invention is constructed so that the thyristor connected to the tap on the low voltage side of the secondary winding of the welding transformer is selected by the gate signal switchover circuit in performing $CO_2$ welding and the thyristor connected to the tap on the high voltage side of the secondary winding of the welding transformer is selected by the gate signal switchover circuit in performing manual welding. With this arrangement, the thyristor connected to the tap on the low voltage side and the thyristor connected to the tap on the high voltage side can be s electively used by each welding method.

The second means of the present invention allows an output current appropriate for each welding method to be supplied with the electrification section of the manual welding holder for manual welding or the welding torch for $CO_2$ welding, keeping them connected to the arc welding apparatus.

An embodiment of the present invention will be described below with reference to FIG. 1.

Figure 1:
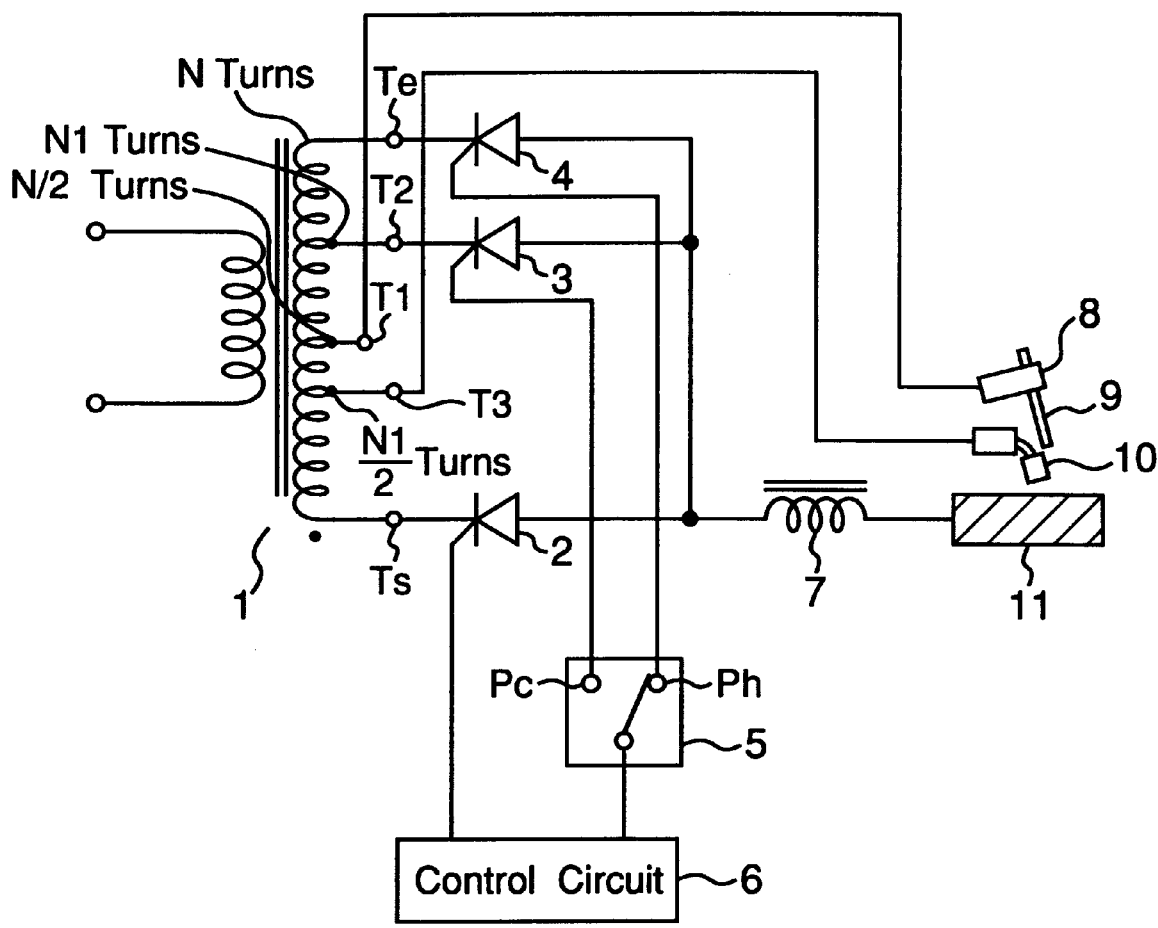
FIG. 1 is a block diagram of an arc welding apparatus according to an embodiment of the present invention.
Figure 2:
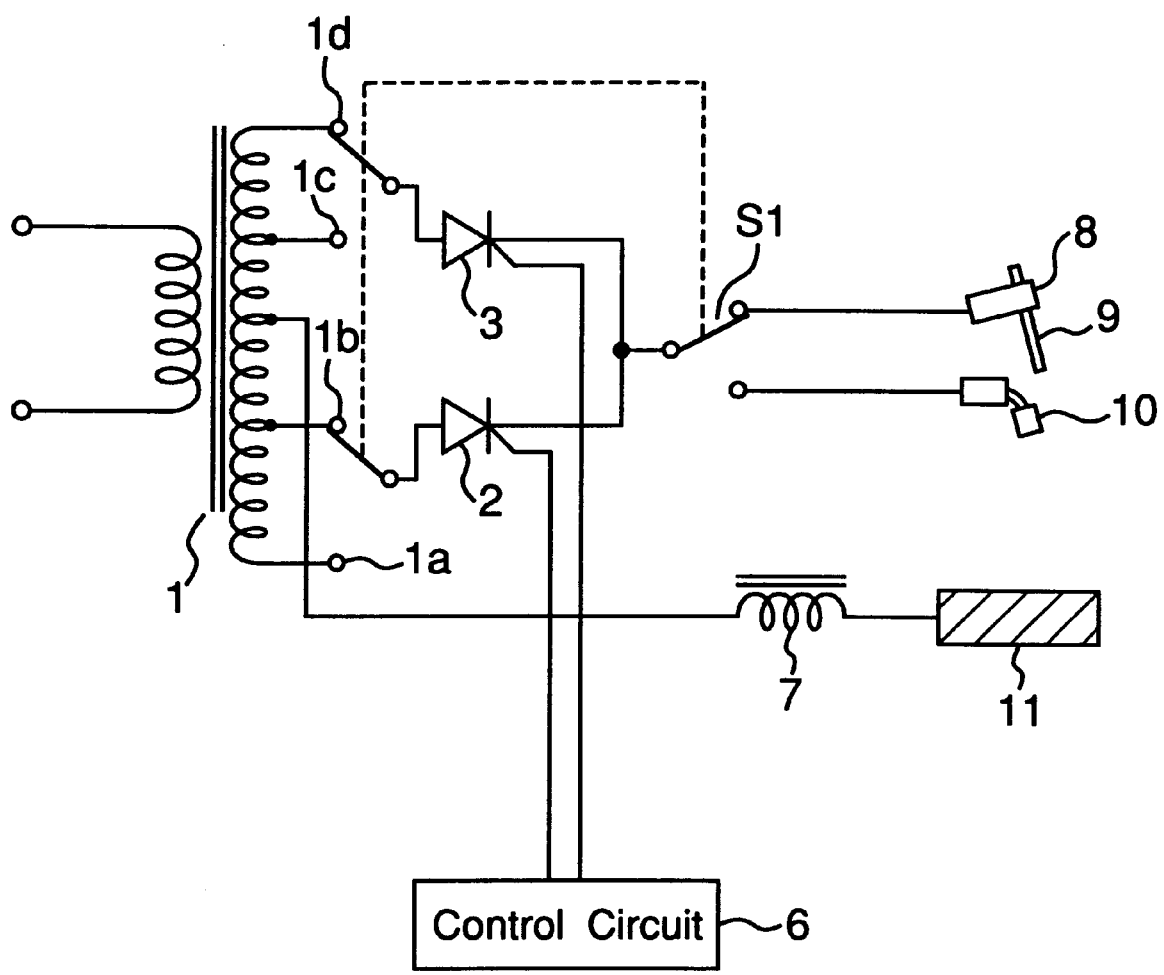
FIG. 2 is a block diagram of a prior art arc welding apparatus.

In FIG. 1, the components 1 through 3 and 6 through 11 are the same as those of the prior art, and therefore, no description is provided for them. The present invention differs from the prior art in that a third thyristor 4 is employed and a gate signal switchover circuit 5 is used in place of the welding method changeover switch S1 of the prior art. A first tap T1 is provided at a point of half (N/2 turns) of the total number of N turns of the secondary winding of the welding transformer 1, and this first tap T1 is connected to the electrification section 9 of the manual welding holder 8. A third tap T3 is provided at a point of half (N1/2 turns) of N1 turns from the starting end Ts of the secondary winding, and this third tap T3 is connected to the welding torch 10 for $CO_2$ welding. A second tap T2 is provided at a point of N1 turns from the starting end Ts of the secondary winding, and the second thyristor 3 is connected to this second tap T2. The first thyristor 2 is connected to the starting end Ts of the secondary winding of the welding transformer 1, while the third thyristor 4 is connected to the terminating end Te of the secondary winding.

When performing manual welding, the first thyristor 2 and the third thyristor 4 at both ends of the secondary winding of the welding transformer are selected by a contact point Ph of the gate signal switchover circuit 5. In this case, the secondary winding of the welding transformer 1 is to be fully used with the first tap T1 served as the neutral point.

When performing $CO_2$ arc welding, the first thyristor 2 on the starting end Ts side and the second thyristor 3 connected to the tap T2 at the point of N1 turns from the starting end Ts are selected by a contact point Pc of the gate signal switchover circuit 5. When performing $CO_2$ arc welding, only the N1 turns from the starting end Ts of the secondary winding of the welding transformer are to be used, and the number of N1 turns is smaller than the total number of N turns of the secondary winding. Therefore, a voltage appearing on the secondary side of the welding transformer becomes lower than when performing manual welding.

As described above, according to the arc welding apparatus of the present embodiment, the switchover between the output characteristics that differ depending on each welding method is enabled by the switchover between the plurality of thyristors to be used for outputting the secondary voltages by means of gate signal switchover circuit 5.

Then, the switchover for determining whether to connect the welding power output to the electrification section 9 of the manual welding holder 8 or to the $CO_2$ welding torch 10 can be achieved by selecting between the thyristors 3 and 4 connected to the taps T2 and Te provided on the secondary winding of the welding transformer 1, obviating the need for using the large-size welding method changeover switch S1 as in the prior art.

When performing manual welding by the present embodiment, the first thyristor 2 and the third thyristor 4 at both ends of the total number of turns of the secondary winding of the welding transformer 1 are used, and the first tap T1 of which the number of turns is half of the total number of turns is connected to the electrification section 9 of the manual welding holder 8. When performing $CO_2$ arc welding, the second thyristor 3 connected to the point of N1 turns and the first thyristor 2 connected to the starting end Ts are used, and the $CO_2$ welding torch 10 is connected to the third tap T3 of which the number of turns is half of N1 turns from the starting end Ts.

That is, the $CO_2$ welding torch 10 and the electrification section 9 of the manual welding holder 8 are directly connected to the neutral point of the secondary winding of the welding transformer 1 through which currents are made to flow by the thyristors 3 and 4 selected depending on each welding method. Therefore, an output of a low no-load voltage appropriate for the $CO_2$ arc welding is outputted to the $CO_2$ welding torch 10, while an output of a high no-load voltage appropriate for manual welding is outputted to the electrification section 9 of the manual welding holder 8.

As described above, since the switchover between the secondary side outputs of the welding transformer is executed using no large-size switch, the circuit of the arc welding apparatus of the present embodiment is remarkably simplified, allowing a cost reduction to be achieved.

Although the present embodiment has been described on the basis of the arc welding apparatus for compatible use of $CO_2$ welding and manual welding, the invention can also be applied likewise to an arc welding apparatus for compatible use of MIG welding and TIG welding in place of $CO_2$ arc welding. That is, one welding requiring an output characteristic of a low no-load voltage and another welding such as manual welding requiring an output characteristic of a high no-load voltage can be achieved by one arc welding apparatus.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An arc welding apparatus which enables manual welding and one of CO2 welding, MIG welding and TIG welding, the apparatus comprising:
    at least three thyristors for controlling an output current of a welding transformer, said at least three thyristors connected to a secondary winding of a welding transformer,
    a control circuit for executing current control of the at least three thyristors, a gate signal switchover circuit for executing selective switchover between gate signals transmitted from said control circuit to a selected plurality of said at least three thyristors, and a reactor for smoothing the output current, wherein the arc welding apparatus controls a voltage drop in said welding transformer by means of said at least three thyristors according to a signal of the control circuit and supplies the voltage to an output of the arc welding apparatus via said reactor, wherein said gate signal switchover circuit executes selective connection so as to operate a thyristor of the at least three thyristors connected to a low voltage tap of the secondary winding of said welding transformer when performing CO2 welding, MIG welding and TIG welding, and said gate signal switch over circuit executes selective connection so as to operate another thyristor of the at least three thyristors connected to a high voltage tap of the secondary winding of said welding transformer when performing manual welding.

2. The arc welding apparatus as claimed in claim 1, wherein a first thyristor of said at least three thyristors is connected to a starting end of the secondary winding of a multi-winding transformer, a third thyristor of said at least three thyristors is connected to a terminating end of the secondary winding, the low voltage tap is provided at a point of N1 turns from the starting end of the secondary winding, a second thyristor of said at least three thyristors is connected to said low voltage tap, and said gate signal switchover circuit executes selection so as to operate the first thyristor and the second thyristor when performing CO2 welding, MIG welding and TIG welding and to operate the first thyristor and the third thyristor when performing manual welding.

3. The arc welding apparatus as claimed in claim 1, wherein a further tap is provided at a point of half (N/2 turns) of a total number of turns (N turns) of the secondary winding of the welding transformer, said further tap is connected to an electrification section of a manual welding holder, an additional tap is provided at a point half (N1/2 turns) of N1 turns, N1 being a number smaller than N, from the starting end of said secondary winding, said additional tap is connected to a welding torch for CO2 welding, MIG welding and TIG welding and the further and additional taps are connected to two of said at least three thyristors selected according to one of the welding methods of manual welding and CO2 welding, MIG welding and TIG welding.

4. The arc welding apparatus as claimed in claim 1, wherein the winding transformer is a multi-winding transformer, the at least three thyristors include a third thyristor which is positioned at a terminating end of the secondary winding, the first thyristor is positioned at a starting end of the secondary winding, the second thyristor is provided between the starting end and terminating end of the secondary winding, and the first and third thyristors are operated when performing the first welding, and the second and third thyristors are operated when performing the second welding according to the selective switchover performed by the gate signal switchover circuit.

5. The arc welding apparatus as claimed in claim 4, further comprising:

a third tap positioned at N/2 turns from a starting end of the secondary winding, N being a total number of turns of the secondary winding of the welding transformer, the third tap being connected to an electrification section of the second welding, and a fourth tap positioned at N1/2 turns from a starting end of the secondary winding, N1 being smaller than N, the second tap being positioned at N1 turns, the fourth tap being connected to a welding torch for the second welding.

6. An arc welding apparatus which supplies both high voltage and low voltage to an output thereof and thereby selectively enables a first welding that requires a high voltage and high no-load voltage, and enables a second welding that requires a low voltage and low no-load voltage, the arc welding apparatus comprising:

a welding transformer having a secondary winding provided with a first tap and a second tap for producing high and low voltages, respectively;

at least three thyristors that control an output current from the secondary winding, the at least three thyristors including a first thyristor connected to the first tap and a second thyristor connected to the second tap;

a control circuit that performs current control of the at least three thyristors by transmitting a gate signal to the at least three thyristors; and a gate signal switchover circuit that is provided between the control circuit to the first and second thyristors and performs selective switchover of the gate signal between the first thyristor and the second thyristor, wherein the gate signal switchover circuit selectively directs the gate signal to the first thyristor when performing the first welding and selectively directs the gate signal to the second thyristor when performing the second welding.

7. The arc welding apparatus as claimed in claim 6, wherein the first welding is a manual welding and the second welding is one of CO2 welding, MIG welding and TIG welding.

* * * * *